US012780990B2

(12) United States Patent
Horigome et al.

(10) Patent No.: US 12,780,990 B2
(45) Date of Patent: Nov. 3, 2026

(54) RESIN COMPOSITION FOR ENCAPSULATING SEMICONDUCTOR ELEMENT-MOUNTED SURFACE OF SUBSTRATE WITH SEMICONDUCTOR ELEMENT MOUNTED THEREON OR SEMICONDUCTOR ELEMENT-FORMING SURFACE OF WAFER WITH SEMICONDUCTOR ELEMENT FORMED THEREON, AND USE THEREOF

(71) Applicant: Shin-Etsu Chemical Co., Ltd., Tokyo (JP)

(72) Inventors: Hiroki Horigome, Annaka (JP); Shoichi Osada, Annaka (JP); Norifumi Kawamura, Annaka (JP); Ryuhei Yokota, Annaka (JP); Kenji Hagiwara, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 365 days.

(21) Appl. No.: 18/203,792

(22) Filed: May 31, 2023

(65) Prior Publication Data

US 2023/0399467 A1 Dec. 14, 2023

(30) Foreign Application Priority Data

Jun. 8, 2022 (JP) ................................ 2022-092872

(51) Int. Cl.

| | |
|---|---|
| ***C08G 73/12*** | (2006.01) |
| ***C08K 5/541*** | (2006.01) |
| ***C08L 79/08*** | (2006.01) |

(52) U.S. Cl.

CPC .............. *C08G 73/12* (2013.01); *C08K 5/541* (2013.01); *C08L 79/085* (2013.01); *C08G 2190/00* (2013.01); *C08L 2203/16* (2013.01)

(58) Field of Classification Search

None

See application file for complete search history.

(56) References Cited

U.S. PATENT DOCUMENTS

| | | | |
|---|---|---|---|
| 2019/0355638 A1 | 11/2019 | Tsutsumi et al. |
| 2020/0317916 A1 | 10/2020 | Tsutsumi et al. |
| 2021/0403672 A1 | 12/2021 | Shiobara et al. |
| 2022/0145151 A1 | 5/2022 | Watanabe et al. |

FOREIGN PATENT DOCUMENTS

| | | | |
|---|---|---|---|
| JP | 2014-1289 A | 1/2014 |
| JP | 2019-203122 A | 11/2019 |
| WO | WO 2020/196070 A1 | 10/2020 |
| WO | WO 2022/264292 A1 | 12/2022 |

OTHER PUBLICATIONS

"Tech Data Sheet BMI-3000," Designer Molecules Inc, XP093088862, Mar. 2016, https://www.designermoleculesinccom.

Extended European Search Report for European Application No. 23174594.4, dated Oct. 16, 2023.

Japanese Office Action for Japanese Application No. 2022-092872, dated Apr. 1, 2025, with English translation.

*Primary Examiner* — Fred M Teskin

(74) *Attorney, Agent, or Firm* — Birch, Stewart, Kolasch & Birch, LLP

(57) ABSTRACT

Provided is an encapsulation resin composition that is suitable for encapsulating a semiconductor element-mounted surface of a substrate with a semiconductor element(s) mounted thereon or a semiconductor element-forming surface of a wafer with a semiconductor element(s) formed thereon, and is superior in low warpage property and grindability. The encapsulation resin composition of the present invention contains:

(A) a maleimide compound having at least one dimer acid frame-derived hydrocarbon group per molecule;

(B) a reaction initiator; and (C) an inorganic filler surface-treated with a silane coupling agent, wherein the component (C) has a maximum particle size of not larger than 40 μm.

14 Claims, No Drawings

RESIN COMPOSITION FOR ENCAPSULATING SEMICONDUCTOR ELEMENT-MOUNTED SURFACE OF SUBSTRATE WITH SEMICONDUCTOR ELEMENT MOUNTED THEREON OR SEMICONDUCTOR ELEMENT-FORMING SURFACE OF WAFER WITH SEMICONDUCTOR ELEMENT FORMED THEREON, AND USE THEREOF

BACKGROUND OF THE INVENTION

Field of the Invention

The present invention relates to a resin composition for encapsulating a semiconductor element-mounted surface of a substrate with a semiconductor element(s) mounted thereon or a semiconductor element-forming surface of a wafer with a semiconductor element(s) formed thereon, and a use thereof.

Background Art

In recent years, wafer level packaging and panel level packaging has gained attention as mobile devices such as smartphones have become smaller, lighter and more sophisticated. In wafer level packaging, a heat-curable resin is used to encapsulate a semiconductor element-mounted surface of an 8-inch or 12-inch substrate with a semiconductor element(s) mounted thereon or a semiconductor element-forming surface of a wafer with a semiconductor element(s) formed thereon, after which grinding, redistribution layer formation, solder ball mounting and so on are carried out before performing dicing so as to complete packaging. Techniques such as TSV (Through Silicon Via) and CoC (Chip on Chip) allow multiple layers of semiconductor elements to be connected with one another and mounted on a substrate such as a silicon interposer, whereby there can be produced a package with not only a reduced size and a reduced weight, but also a higher density. Further, unlike the conventional method where packaging is carried out after dicing a processed wafer into individual chips, there is also a merit of reducing production cost as packaging is carried out while in the state of a wafer, and the packaged wafer was then diced into individual chips as completed products.

Wafer level packaging and panel level packaging bears a problem of exhibiting warpages after encapsulation. While molding and encapsulation can be realized without any major problems if the substrate used is a small-diameter wafer or the like, a noticeable warpage will occur in the substrate if it is a 12-inch wafer as a wafer having a diameter of not smaller than 8 inches, or if performing panel level molding with an even larger area, due to a difference in thermal expansion coefficient between the substrate and a heat-curable resin. This warpage shall be problematic in later steps such as a transporting step, a grinding step, a probing step, and a dicing step, and may even modify an element characteristic(s) according to a device.

In order to solve such problem, JP-A-2014-1289 discloses a composition containing a liquid bismaleimide compound having a dimer acid frame-derived divalent hydrocarbon group(s); however, noticeable warpages were observed when using a large-area wafer of not smaller than 12 inches due to a high elastic modulus after curing that was triggered by an allyl compound added as a reactive diluent. Further, JP-A-2019-203122 discloses a composition containing a solid bismaleimide compound having a dimer acid frame-derived hydrocarbon group(s); however, the composition exhibited rooms for further improvement in terms of surface roughness after grinding.

SUMMARY OF THE INVENTION

Thus, it is an object of the present invention to provide an encapsulation resin composition that yields a reduced and restricted warpage even when applied to an electronic part requiring a low warpage property, and is capable of being turned into a cured product exhibiting a small surface roughness after grinding.

The inventors of the present invention diligently conducted a series of studies to solve the above problem. As a result, the inventors completed the invention by finding that an encapsulation resin composition shown below is able to achieve the above object. That is, the present invention is to provide the following encapsulation resin composition and a semiconductor device having a cured product of such composition.

[1]

An encapsulation resin composition for encapsulating a semiconductor element-mounted surface of a substrate with one or more semiconductor elements mounted thereon or a semiconductor element-forming surface of a wafer with one or more semiconductor elements formed thereon, comprising:

(A) a maleimide compound having at least one dimer acid frame-derived hydrocarbon group per molecule;

(B) a reaction initiator; and (C) an inorganic filler surface-treated with a silane coupling agent, wherein the component (C) has a maximum particle size of not larger than 40 μm.

[2]

The encapsulation resin composition according to [1], wherein the component (A) is at least a maleimide compound represented by the following formula (1) and/or a maleimide compound represented by the following formula (2)

(1)

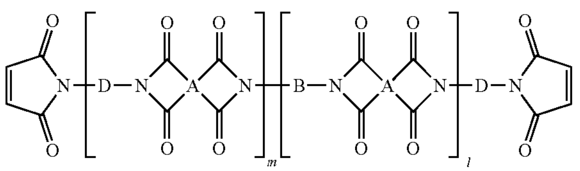

wherein A independently represents a tetravalent organic group having a cyclic structure; B independently represents a divalent alicyclic hydrocarbon group having 6 to 60 carbon atoms; D independently represents a divalent hydrocarbon group having 6 to 200 carbon atoms, where at least one D represents a dimer acid frame-derived hydrocarbon group; m is 1 to 100, and l is 1 to 200; no restrictions are imposed on an order of each repeating unit identified by m and l, and a bonding pattern may be alternate, block or random, (2)

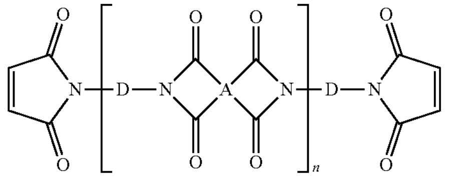

wherein A independently represents a tetravalent organic group having a cyclic structure; D independently represents a divalent hydrocarbon group having 6 to 60 carbon atoms, where at least one D represents a dimer acid frame-derived hydrocarbon group; n is 0 to 100.

[3]

The encapsulation resin composition according to [2], wherein A in the formulae (1) and (2) is any one of the tetravalent organic groups represented by the following structural formulae

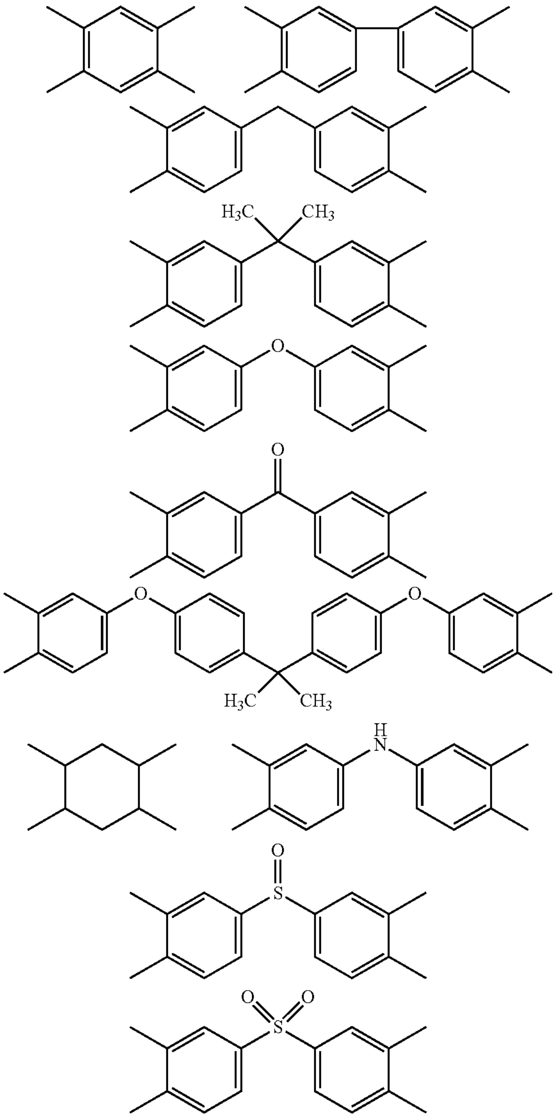

-continued

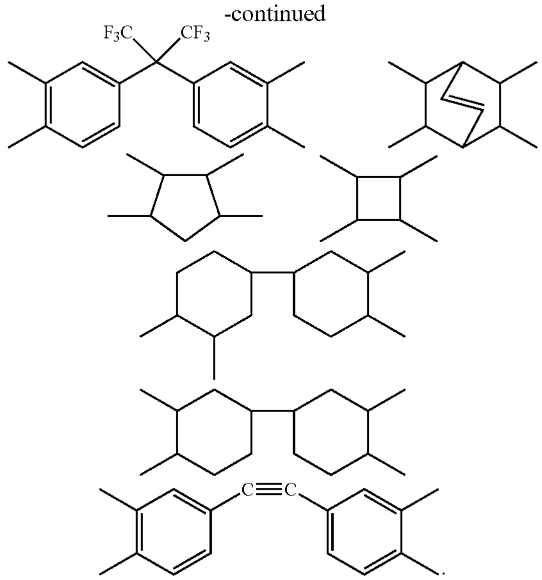

[4]

The encapsulation resin composition according to any one of [1] to [3], wherein the silane coupling agent used to surface-treat the inorganic filler as the component (C) is at least one aminosilane selected from N-2-(aminoethyl)-3-aminopropyltrimethoxysilane, N-2-(aminoethyl)-8-aminooctyltrimethoxysilane, 3-aminopropyltrimethoxysilane, N-phenyl-3-aminopropyltrimethoxysilane, and 2,2-dimethoxy-1-phenyl-1-aza-2-silacyclopentane.

[5]

The encapsulation resin composition according to any one of [1] to [4], wherein the component (C) is contained in an amount of 30 to 95% by mass in the whole composition.

[6]

The encapsulation resin composition according to any one of [1] to [5], wherein the component (B) is a thermal radical polymerization initiator and/or an anionic polymerization initiator.

[7]

The encapsulation resin composition according to any one of [1] to [6], wherein the encapsulation resin composition is in the form of granules, a sheet or a film.

[8]

The encapsulation resin composition according to any one of [1] to [7], wherein the encapsulation resin composition is for use in wafer level packaging, panel level packaging, fan-out wafer level packaging, fan-out panel level packaging, or antenna-in-packaging.

[9]

A semiconductor device having a cured product of the encapsulation resin composition according to any one of [1] to [8].

The encapsulation resin composition of the present invention yields a reduced and restricted warpage even when applied to an electronic part requiring a low warpage property, and is capable of being turned into a cured product exhibiting a small surface roughness after grinding.

Thus, the encapsulation resin composition of the present invention is useful for encapsulating a semiconductor element-mounted surface of a substrate with a semiconductor element(s) mounted thereon or a semiconductor element-forming surface of a wafer with a semiconductor element(s) formed thereon.

DETAILED DESCRIPTION OF THE INVENTION

The present invention is described in greater detail hereunder.

(A) Maleimide Compound Having at Least One Dimer Acid Frame-Derived Hydrocarbon Group Per Molecule An encapsulation resin composition of the present invention contains (A) a maleimide compound having at least one dimer acid frame-derived hydrocarbon group per molecule. A dimer acid refers to a liquid fatty acid of a dicarboxylic acid having 36 carbon atoms, which is obtained by dimerizing an unsaturated fatty acid having 18 carbon atoms and employing a vegetable fat or oil such as oleic acid and linoleic acid as its raw material. A dimer acid frame may contain multiple structures as opposed to one single type of frame, and there exist several types of isomers. Typical dimer acids are categorized under the names of (a) linear type, (b, c) monocyclic type, (d) aromatic ring type, and (e) polycyclic type.

In this specification, a dimer acid frame refers to a group induced from a dimer diamine having a structure established by substituting the carboxy groups in such dimer acid with primary aminomethyl groups. That is, as a dimer acid frame, it is preferred that the component (A) have a group obtained by substituting the two carboxy groups in any of the following dimer acids (a) to (e) with methylene groups.

Further, as for the dimer acid frame-derived divalent hydrocarbon group in the component (A), more preferred from the perspectives of heat resistance and reliability of a cured product are those having a structure with a reduced number of carbon-carbon double bonds in the dimer acid frame-derived hydrocarbon group due to a hydrogenation reaction.

(a)

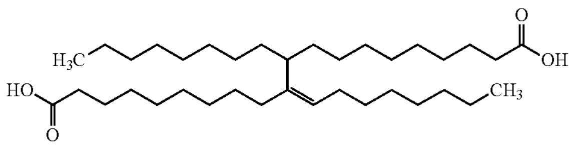

(b)

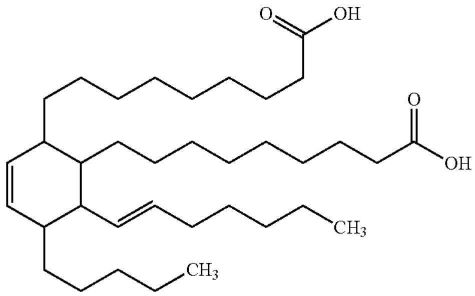

(c)

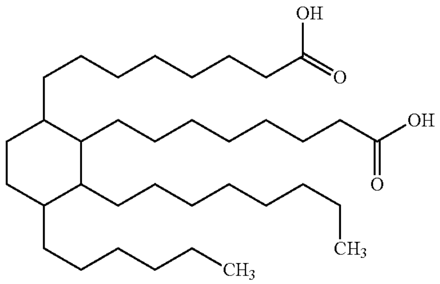

-continued (d)

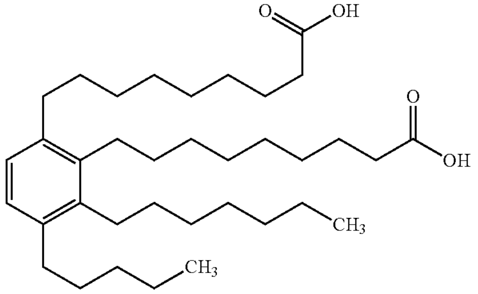

(e)

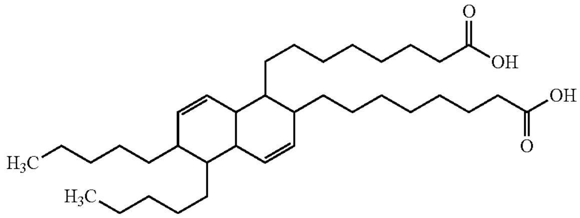

The component (A) contained in the encapsulation resin composition of the present invention is preferably a maleimide compound represented by the following formula (1) and/or a maleimide compound represented by the following formula (2).

(1)

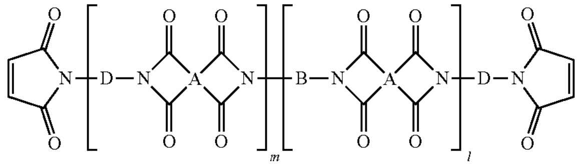

In the formula (1), A independently represents a tetravalent organic group having a cyclic structure; B independently represents a divalent alicyclic hydrocarbon group having 6 to 60 carbon atoms; D independently represents a divalent hydrocarbon group having 6 to 200 carbon atoms, where at least one D represents a dimer acid frame-derived hydrocarbon group; m is 1 to 100, and l is 1 to 200; no restrictions are imposed on an order of each repeating unit identified by m and l, and a bonding pattern may be alternate, block or random.

(2)

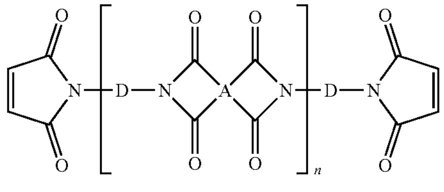

In the formula (2), A independently represents a tetravalent organic group having a cyclic structure, as is the case in the formula (1); D independently represents a divalent hydrocarbon group having 6 to 60 carbon atoms, where at least one D represents a dimer acid frame-derived hydrocarbon group, as is the case in the formula (1); n is 0 to 100.

As compared to other maleimide compounds having a dimer acid frame-derived hydrocarbon group(s), the maleimide compound represented by the formula (1) brings about a higher glass-transition temperature after curing, which imparts a high reliability to the composition if the composition contains such maleimide compound of the formula (1). Further, a composition containing the maleimide compound represented by the formula (1) exhibits a lower elastic modulus after curing as compared to other compositions containing a general aromatic maleimide compound, reduces warpage of an encapsulated substrate, and endows an improved crack resistance in a reliability test.

In the formula (1), A independently represents a tetravalent organic group having a cyclic structure; particularly, it is preferred that A be any one of the tetravalent organic groups represented by the following structural formulae.

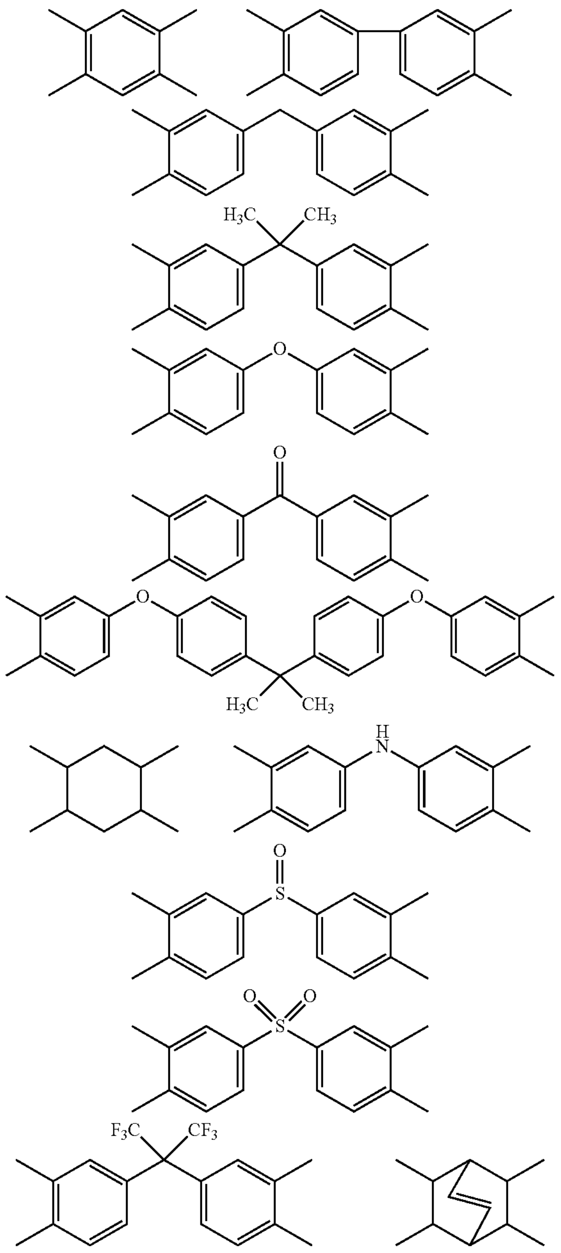

-continued

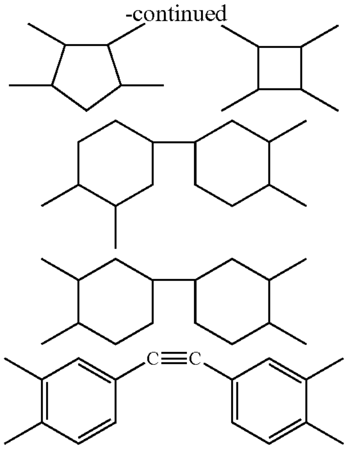

Bonds in the above structural formulae that are yet unbonded to substituent groups are to be bonded to carbonyl carbons forming cyclic imide structures in the formula (1).

In the formula (1), D independently represents a divalent hydrocarbon group having 6 to 200, preferably 8 to 100, more preferably 10 to 50 carbon atoms. Particularly, it is preferred that D be a branched divalent hydrocarbon group with at least one hydrogen atom in the above divalent hydrocarbon group being substituted by an alkyl or alkenyl group(s) having 6 to 200, preferably 8 to 100, more preferably 10 to 50 carbon atoms. The branched divalent hydrocarbon group may be either a saturated aliphatic hydrocarbon group or an unsaturated hydrocarbon group, and may also have an alicyclic structure or an aromatic ring structure in the midway of the molecular chain.

One specific example of the branched divalent hydrocarbon group may be a divalent hydrocarbon group derived from a dual-end diamine called dimer diamine. Thus, it is particularly preferred that D be a group obtained by substituting the two carboxy groups in any of the dimer acids represented by (a) to (e) with methylene groups, and there is at least one such dimer acid frame-derived hydrocarbon group in each molecule.

Further, in the formula (1), B independently represents a divalent alicyclic hydrocarbon group having 6 to 60 carbon atoms, preferably a divalent aliphatic hydrocarbon group, more preferably a divalent aliphatic hydrocarbon group having 6 to 30 carbon atoms. As such aliphatic hydrocarbon group, preferred is one having a cyclohexane frame. As a mode having such cyclohexane frame, there may be employed those having one cyclohexane ring, such as the one represented by the following formula (3); or those of polycyclic type with a plurality of cyclohexane rings being either bonded together via alkylene group(s) or bridged.

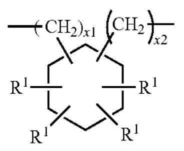

(3)

In the formula (3), $R^1$ independently represents a hydrogen atom or an alkyl group having 1 to 5 carbon atoms; each of x1 and x2 independently represents a number of 0 to 4.

Here, specific examples of $R^1$ include a hydrogen atom, a methyl group, an ethyl group, a n-propyl group, an isopropyl group, a n-butyl group, an isobutyl group, and a t-butyl group. Particularly, a hydrogen atom and a methyl group are preferred. Here, $R^1$s may be identical to or different from one another.

Further, each of x1 and x2 independently represents a number of 0 to 4, preferably a number of 0 to 2. Here, x1 and x2 may be identical to or different from each other.

Specific examples of B may include the divalent alicyclic hydrocarbon groups expressed by the following structural formulae.

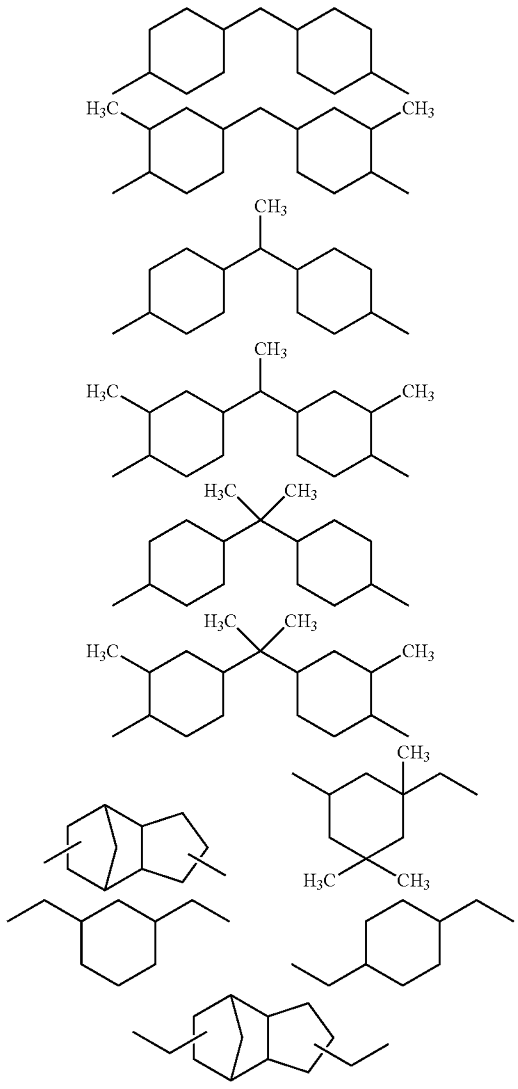

Bonds in the above structural formulae that are yet unbonded to substituent groups are to be bonded to nitrogen atoms forming cyclic imide structures in the formula (1).

In the formula (1), m is 1 to 100, preferably 1 to 60, more preferably 2 to 50; l is 1 to 200, preferably 1 to 50, more preferably 3 to 40. Extremely large m and l may lead to an impaired fluidity and a poor moldability accordingly.

No restrictions are imposed on the order of each repeating unit identified by m and l, and the bonding pattern may be alternate, block or random; a block bonding pattern is preferred in terms of ease in achieving a higher Tg.

A composition containing the maleimide compound represented by the formula (2) exhibits a low elastic modulus after curing, reduces warpage of an encapsulated substrate, and endows an improved crack resistance in a reliability test. Further, a composition containing the maleimide compound represented by the formula (2) is also superior in dielectric properties at high frequencies.

As is the case with A in the formula (1), A in the formula (2) independently represents a tetravalent organic group having a cyclic structure, and it is likewise preferred that A be any one of the tetravalent organic groups represented by the following structural formulae.

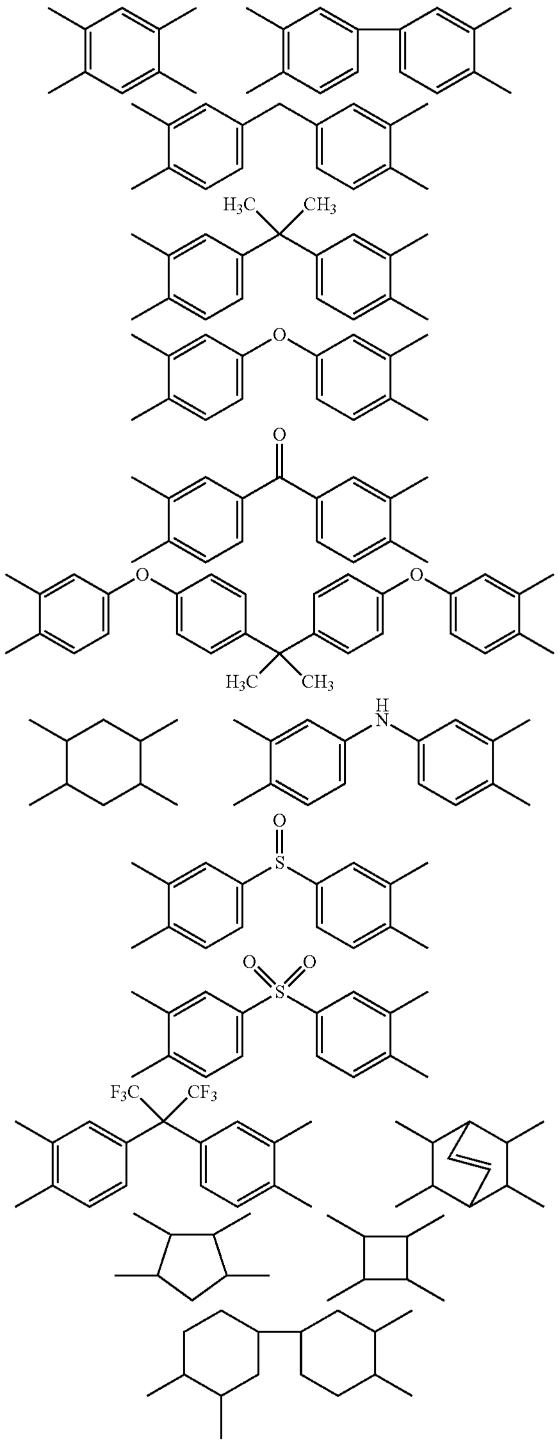

-continued

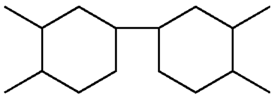

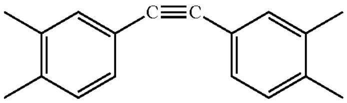

Bonds in the above structural formulae that are yet unbonded to substituent groups are to be bonded to carbonyl carbons forming cyclic imide structures in the formula (2).

Further, as is the case with D in the formula (1), D in the formula (2) independently represents a divalent hydrocarbon group having 6 to 200, preferably 8 to 100, more preferably 10 to 50 carbon atoms. As is the case with D in the formula (1), it is preferred that D in the formula (2) be a branched divalent hydrocarbon group with at least one hydrogen atom in the above divalent hydrocarbon group being substituted by an alkyl or alkenyl group(s) having 6 to 200, preferably 8 to 100, more preferably 10 to 50 carbon atoms. The branched divalent hydrocarbon group may be either a saturated aliphatic hydrocarbon group or an unsaturated hydrocarbon group, and may also have an alicyclic structure or an aromatic ring structure in the midway of the molecular chain.

One specific example of the branched divalent hydrocarbon group may be a divalent hydrocarbon group derived from a dual-end diamine called dimer diamine. Thus, it is particularly preferred that D be a group obtained by substituting the two carboxy groups in any of the dimer acids represented by (a) to (e) with methylene groups, and there is at least one such dimer acid frame-derived hydrocarbon group in each molecule.

In the formula (2), n is 0 to 100, preferably 0 to 60, more preferably 0 to 50; An extremely large n may lead to an impaired solubility and fluidity, as well as a poor moldability accordingly.

In terms of handling property and achieving a small degree of warpage after encapsulation, the maleimide compound as the component (A) is preferably one being a solid at 25° C.

There are no particular restrictions on the number average molecular weight of the maleimide compound as the component (A); in terms of handling property of the composition, the number average molecular weight of this maleimide compound is preferably 800 to 50,000, more preferably 900 to 30,000. Further, other than the maleimide compound of the formula (1) and/or the maleimide compound of the formula (2), the component (A) may contain another maleimide compound having at least one dimer acid frame-derived hydrocarbon group per molecule, and there may be employed one or more kinds of the component (A).

Here, the number average molecular weight mentioned in the present invention refers to a number average molecular weight that is measured by gel permeation chromatography (GPC) under the following conditions, using polystyrene as a reference substance.

Measurement Conditions

Developing solvent: Tetrahydrofuran (THF)

Flow rate: 0.35 mL/min

Detector: Differential refractive index detector (RI)

Column: TSK Guardcolumn Super H-L

TSK gel Super HZ4000 (4.6 mm I.D.×15 cm×1)

TSK gel Super HZ3000 (4.6 mm I.D.×15 cm×1)

TSK gel Super HZ2000 (4.6 mm I.D.×15 cm×2)

(All manufactured by Tosoh Corporation)

Column temperature: 40° C.

Sample injection volume: 5 μL (THF solution with a concentration of 0.2% by mass)

(B) Reaction Initiator

A reaction initiator used in the present invention is added to promote the cross-linking reaction of the component (A), or a reaction between the component (A) and a later-described heat-curable resin having reactive groups capable of reacting with maleimide groups. There are no particular restrictions on the component (B) so long as it is capable of promoting a curing reaction; a thermal radical polymerization initiator and/or an anionic polymerization initiator are preferred as the composition will exhibit a favorable curability.

As the thermal radical polymerization initiator, preferred are organic peroxides such as hydroperoxide, dialkyl peroxide, peroxyester, diacyl peroxide, peroxycarbonate, peroxyketal, and ketone peroxide. In terms of perseveration stability, more preferred is an organic peroxide having a 10-hour half-life temperature of 70 to 170° C. Specific examples of the thermal radical polymerization initiator include dicumyl peroxide, t-butyl peroxybenzoate, t-amyl peroxybenzoate, dibenzoyl peroxide, dilauroyl peroxide, 2,5-dimethyl-2,5-di(tert-butylperoxy)hexane, tert-butyl cumyl peroxide, di-tert-butyl peroxide, 1,1,3,3-tetramethylbutyl hydroperoxide, cumene hydroperoxide, and 1,1-di(t-butylperoxy)cyclohexane.

As the anionic polymerization initiator, preferred is at least one kind of compound selected from an imidazole compound, a phosphorus-based compound, an amine compound, and a urea-based compound.

Specific examples of the imidazole compound include imidazole, 2-methylimidazole, 2-ethylimidazole, 2-heptadecylimidazole, 1,2-dimethylimidazole, 2-ethyl-4-methylimidazole, 2-undecylimidazole, 2-phenylimidazole, 2-phenyl-4-methylimidazole, 1-benzyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 2-phenyl-4,5-dihydroxymethylimidazole, 2-phenyl-4-methyl-5-hydroxymethylimidazole, a diaminotriazine ring-containing imidazole such as 2,4-diamino-6-[2'-methylimidazolyl-(1')]-ethyl-s-triazine, and microencapsulated products of these compounds.

Specific examples of the phosphorus-based compound include tributylphosphine, tri(p-methylphenyl)phosphine, tri(nonylphenyl)phosphine, triphenylphosphine, triphenylphosphine-triphenylborane, tetraphenylphosphine-tetraphenylborate, and microencapsulated products of these compounds.

Specific examples of the amine compound include triethylamine, benzyldimethylamine, α-methylbenzyldimethylamine, 1,8-diazabicyclo[5.4.0]undecene, tris(dimethylaminomethyl)phenol, and microencapsulated products of these compounds.

Specific examples of the urea-based compound include N,N,N',N'-tetramethylurea, N'-phenyl-N,N-dimethylurea, N,N-diethylurea, N'-[3-[[[(dimethylamino)carbonyl]amino]methyl]-3,5,5-trimethylcyclohexyl]-N,N-dimethylurea, and N,N''-(4-methyl-1,3-phenylene)bis(N',N'-dimethylurea).

Any one kind of these reaction initiators may be used alone, or any two or more kinds of them may be used in combination. The reaction initiator is preferably added in an amount of 0.1 to 8 parts by mass, more preferably 0.2 to 6 parts by mass, even more preferably 0.3 to 4 parts by mass, per a total of 100 parts by mass of the component (A). The curing reaction will proceed in a sufficient manner when the reaction initiator is contained in an amount of not smaller than 0.1 parts by mass; the encapsulation resin composition will exhibit a favorable preservation stability when the reaction initiator is contained in an amount of not larger than 8 parts by mass.

(C) Inorganic Filler

An inorganic filler (C) is added to reduce the thermal expansion coefficient of a cured product of the encapsulation resin composition of the present invention, and improve the mechanical properties thereof; the inorganic filler used in the present invention is one that has a maximum particle size of not larger than 40 μm, and has been surface-treated with a silane coupling agent. Examples of the inorganic filler include silicas such as a spherical silica, a molten silica, a crystalline silica, and cristobalite; alumina; silicon nitride; aluminum nitride; boron nitride; titanium oxide; glass fibers; and magnesium oxide. There may also be listed a fluorine resin-containing filler or a fluorine resin coating filler for the purpose of improving dielectric properties. The average particle sizes and shapes of these inorganic fillers can be selected in accordance with the intended use.

The maximum particle size of the inorganic filler (C) is a maximum value obtained in a volume particle size distribution measurement carried out by a laser diffraction/scattering measurement method; this maximum particle size is not larger than 40 μm, preferably not larger than 30 μm, even more preferably not larger than 20 μm. If the maximum particle size is not larger than 40 μm, the surface roughness of the surface of the cured product after encapsulation can still be reduced even when the filler has dropped off as a result of grinding such surface.

An average particle size D50 of the inorganic filler (C) is preferably 0.1 to 20 μm, more preferably 0.15 to 10 μm, even more preferably 0.2 to 8 μm, when measured by a volume particle size distribution measurement utilizing a laser diffraction/scattering measurement method.

If necessary, the inorganic filler (C) used may be one that has been subjected to a top cut classification. The top cut classification here refers to a classification that is performed, via a wet sieving method, on an inorganic filler produced. The aperture of a sieve used in the classification is called a top cut diameter; the top cut diameter is a value at which a ratio of particles larger than such aperture is not higher than 2% by volume when measured by a volume particle size distribution measurement utilizing a laser diffraction/scattering measurement method. The top cut diameter is preferably 1 to 40 μm, more preferably 1.5 to 30 μm, even more preferably 2 to 20 μm, in a wet sieving method.

In order to improve a bond strength between the resin component and the inorganic filler, the inorganic filler used is one that has already been surface-treated with a silane coupling agent. There may be listed an epoxy group-, an amino group-, a mercapto group-, a vinyl group-, a styryl group-, or a methacryl group-containing silane coupling agent, examples of which may include epoxysilanes such as 3-glycidoxypropyltrimethoxysilane, 3-glycidoxypropylmethyldiethoxysilane, and 2-(3,4-epoxycyclohexyl)ethyltrimethoxysilane; aminosilanes such as N-2-(aminoethyl)-3-aminopropyltrimethoxysilane, N-2-(aminoethyl)-8-aminooctyltrimethoxysilane, 3-aminopropyltrimethoxysilane, N-phenyl-3-aminopropyltrimethoxysilane, and 2,2-dimethoxy-1-phenyl-1-aza-2-silacyclopentane; mercaptosilanes such as 3-mercaptosilane and 3-episulfidoxypropyltrimethoxysilane; vinylsilanes such as vinyltrimethoxysilane and vinyltriethoxysilane; styrylsilanes such as p-styryltrimethoxysilane; and methacrylsilanes such as 3-methacryloxypropylmethyldimethoxysilane, 3-methacryloxypropyltrimethoxysilane, 3-methacryloxypropylmethyldiethoxysilane, and 3-methacryloxypropyltriethoxysilane. In terms of strength improvement, preferred are an amino group-, a methacryl group-, a vinyl group-, or a styryl group-containing silane coupling agent, particularly preferred is an amino group-containing silane coupling agent.

Any one kind of these silane coupling agents may be used alone, or two or more kinds of them may be used in combination.

Further, there are no particular restrictions on a treatment method using the silane coupling agent; a conventionally known method may be employed. The amount of the silane coupling agent used for surface treatment may be appropriately adjusted in accordance with desired properties; for example, the silane coupling agent may be used preferably in an amount of 0.1 to 5 parts by mass, more preferably 0.15 to 4 parts by mass, even more preferably 0.2 to 3 parts by mass, per 100 parts by mass of the inorganic filler.

The inorganic filler is preferably added in an amount of 10 to 2,000 parts by mass, more preferably 20 to 1,200 parts by mass, even more preferably 40 to 1,000 parts by mass, per the total of 100 parts by mass of the component (A). Further, the inorganic filler is preferably contained in the composition by an amount of 30 to 95% by mass, more preferably 40 to 92% by mass, even more preferably 50 to 90% by mass, with the whole composition being 100% by mass. When the inorganic filler is used in the above range(s), the viscosity of the composition will not be too high at the time of molding, whereby molding defect can be prevented.

Other Additives

The encapsulation resin composition of the present invention may further contain various additives as appropriate within a scope which does not impair the effects of the present invention. These other additives are exemplified below.

Heat-Curable Resin Having Reactive Group Capable of Reacting with Maleimide Group The present invention may further contain a heat-curable resin having reactive groups capable of reacting with maleimide groups.

No restrictions are imposed on the type of such heat-curable resin, examples of which may include various resins other than the component (A), such as an epoxy resin, a phenolic resin, a cyanate resin, a melamine resin, a silicone resin, a cyclic imide resin such as a maleimide compound other than the component (A), a urea resin, a heat-curable polyimide resin, a modified polyphenylene ether resin, a heat-curable acrylic resin, and an epoxy-silicone hybrid resin. Further, as a reactive group capable of reacting with maleimide groups, there may be listed, for example, an epoxy group, a maleimide group, a hydroxyl group, an acid anhydride group, an alkenyl group such as an allyl group and a vinyl group, a (meth)acryl group, and a thiol group. Here, as is the case with an epoxy group, the reactive group may for example be one generating an active species by reaction with imidazole, and undergoing anionic polymerization by reaction with maleimide groups. There are no particular restrictions on an added amount of the heat-curable resin having reactive groups capable of reacting with maleimide groups; such heat-curable resin may for example be in an amount of 0 to 60% by mass in a sum total of heat-curable resin i.e. a sum total of the component (A) and the heat-curable resin having reactive groups capable of reacting with maleimide groups.

Flame Retardant

The present invention may contain a flame retardant to impart a flame retardancy. Examples of such flame retardant include a halogenated epoxy resin, a phosphazene compound, a silicone compound, a zinc molybdate-supported talc, a zinc molybdate-supported zinc oxide, aluminum hydroxide, magnesium hydroxide, molybdenum oxide, and antimony trioxide. Any one kind of these flame retardants may be used alone, or two or more kinds of them may be used in combination; in terms of environmental load and securing fluidity, preferred are a phosphazene compound, a zinc molybdate-supported zinc oxide, molybdenum oxide, aluminum hydroxide, and magnesium hydroxide.

Ion-Trapping Agent

The present invention may contain an ion-trapping agent to improve electric properties. Examples of such ion-trapping agent include a hydrotalcite compound, a bismuth compound, and a zirconium compound; any one kind of these ion-trapping agents may be used alone, or two or more kinds of them may be used in combination.

Flexibility-Imparting Agent

The present invention may contain a flexibility-imparting agent to impart a flexibility. Examples of such flexibility-imparting agent include silicone compounds such as a silicone oil, a silicone resin, a silicone-modified epoxy resin, and a silicone-modified phenolic resin; and thermoelastic elastomers such as a styrene resin and an acrylic resin. Any one kind of these flexibility-imparting agents may be used alone, or two or more kinds of them may be used in combination.

Colorant

The present invention may contain a colorant to achieve a color stability of an appearance after encapsulation. Examples of such colorant include carbon black, titanium black, and titanium oxide; any one kind of these colorants may be used alone, or two or more kinds of them may be used in combination.

In addition to the above additives, the present invention may also contain an adhesion aid, a mold release agent, a reactive diluent, and a light stabilizer.

As a method for producing the encapsulation resin composition of the present invention, there may be appropriately used a conventionally known method. The production method may for example be one employing a planetary mixer, a heated roll, a kneader, an extruder or the like. If the heat-curable resin composition obtained is a solid, the composition may be turned into the form of a powder by being crushed, turned into the form of tablets by tableting the crushed composition, turned into the form of granules by removing coarse grains and fine powders via a sieve after performing crushing, or turned into the form of a sheet using a pressing device or a T-die. Also, by applying to a support sheet a varnish with the encapsulation resin composition being dissolved in an organic solvent, and then by performing heating at a temperature of normally not lower than 80° C., preferably not lower than 100° C. for 1 to 60 min, the composition may be turned into the form of an uncured film from which the organic solvent has been removed. In terms of handling property at the time of use and reducing impacts of contamination caused by powdery dust, it is more preferred that the composition be in the form of granules, a sheet or a film.

Use of Encapsulation Resin Composition

There are no particular restrictions on a use of the encapsulation resin composition of the present invention so long as it is used to encapsulate a semiconductor element-mounted surface of a substrate with a semiconductor element(s) mounted thereon or a semiconductor element-forming surface of a wafer with a semiconductor element(s) formed thereon; the composition of the present invention is effective as an encapsulation resin composition for use in wafer level packaging, panel level packaging, fan-out wafer level packaging, and fan-out panel level packaging. Further, the encapsulation resin composition of the present invention is also suitable for use in antenna-in-packaging as it exhibits low dielectric properties at high frequencies. There are no particular restrictions on a method for encapsulating a semiconductor device with the aid of the encapsulation resin composition of the present invention; while there may be used a conventional molding method such as transfer molding, injection molding, compression molding, cast molding, and lamination, compression molding is more preferred.

WORKING EXAMPLES

The present invention is described in greater detail hereunder with reference to working and comparative examples; the present invention shall not be limited to the following working examples.

The components used in the working and comparative examples are shown below. Here, an average particle size and a maximum particle size are values measured by the above method.

(A) Maleimide Compound Having at Least One Dimer Acid Frame-Derived Hydrocarbon Group Per Molecule (A-1): Dimer acid frame-derived hydrocarbon group-containing bismaleimide compound represented by the following formula (SLK-3000 by Shin-Etsu Chemical Co., Ltd., number average molecular weight: 8,000)

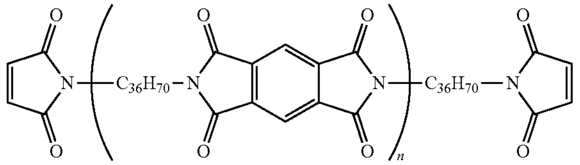

$-C_{36}H_{70}-$ represents a dimer acid frame-derived structure.

n≈5 (Average value)

(A-2): Dimer acid frame-derived hydrocarbon group-containing bismaleimide compound represented by the following formula (SLK-2600 by Shin-Etsu Chemical Co., Ltd., number average molecular weight: 5,000)

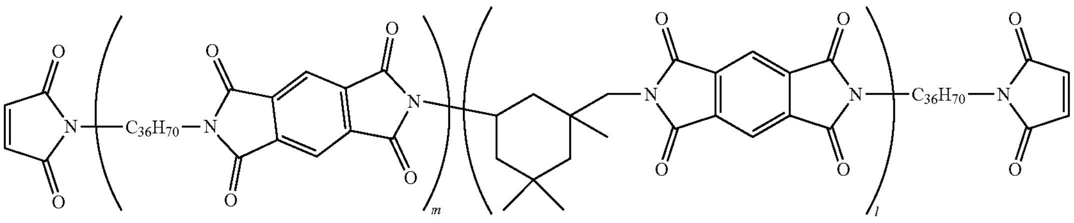

$-C_{36}H_{70}-$ represents a dimer acid frame-derived structure.

m≈2, l≈2 (Average value)

Maleimide Compound for Use in Comparative Example (A'-3): Phenylmethane maleimide (BMI-2300 by Daiwakasei Industry Co., LTD.)

(B) Reaction Initiator (B-1): Dicumylperoxide (PERCUMYL D by NOF CORPORATION)

(B-2): 2-ethyl-4-methylimidazole (2E4MZ by SHIKOKU KASEI HOLDINGS CORPORATION)

(C) Inorganic Filler (C-1): Silica prepared by performing dry surface treatment on 100 parts by mass of a molten spherical silica (MUF-4 by TATSUMORI LTD.) having an average particle size of 4 μm and a maximum particle size of 20 μm, using 0.3 parts by mass of N-phenyl-3-aminopropyltrimethoxysilane (KBM-573 by Shin-Etsu Chemical Co., Ltd.)

(C-2): Silica prepared by performing dry surface treatment on 100 parts by mass of a molten spherical silica (MUF-4 by TATSUMORI LTD.) having an average particle size of 4 μm and a maximum particle size of 20 μm, using 0.3 parts by mass of 3-aminopropyltrimethoxysilane (KBM-903 by Shin-Etsu Chemical Co., Ltd.)

(C-3): Silica prepared by performing dry surface treatment on 100 parts by mass of a spherical silica (SO-25H by ADMATECHS COMPANY LIMITED) having an average particle size of 0.5 μm and a maximum particle size of 5 μm, using 0.3 parts by mass of N-phenyl-3-aminopropyltrimethoxysilane (KBM-573 by Shin-Etsu Chemical Co., Ltd.) Inorganic filler for use in comparative example (C'-4): Molten spherical silica (MUF-4 by TATSUMORI LTD.) having an average particle size of 4 μm and a maximum particle size of 20 μm (C'-5): Silica (RS-8225H/53C by TATSUMORI LTD.) prepared by performing dry surface treatment on 100 parts by mass of a molten spherical silica having an average particle size of 13 μm and a maximum particle size of 53 μm, using 0.3 parts by mass of N-phenyl-3-aminopropyltrimethoxysilane (KBM-573 by Shin-Etsu Chemical Co., Ltd.)

(C'-6): Silica prepared by performing dry surface treatment on 100 parts by mass of a molten spherical silica (FB-5604FC by Denka Company Limited) having an average particle size of 27 μm and a maximum particle size of 55 μm, using 0.3 parts by mass of N-phenyl-3-aminopropyltrimethoxysilane (KBM-573 by Shin-Etsu Chemical Co., Ltd.)

(D) Other Heat-Curable Resin (D-1): Dicyclopentadiene-type epoxy resin (HP-7200 by DIC Corporation)

(E) Silane Coupling Agent (E-1): N-phenyl-3-aminopropyltrimethoxysilane (KBM-573 by Shin-Etsu Chemical Co., Ltd.)

Working Examples 1 to 9; Comparative Examples 1 to 5

The components were melted and mixed at the compounding ratios (parts by mass) shown in Table 1 before carrying out cooling and crushing. Next, a sieve having an aperture of 2 mm and a sieve having an aperture of 0.5 mm were used to remove coarse grains and fine powders, thereby obtaining a granular resin composition. Each composition was evaluated in accordance with the methods shown below, and the results thereof are shown in Table 1.

Warpage

A compression molding device (by APIC YAMADA CORPORATION) was used to mold the above resin composition on a 12-inch silicon wafer having a thickness of 775 μm so that a resin thickness after molding would be 400 μm. Molding temperatures and molding times are shown in Table 1. After performing post curing at 180° C. for two hours, warpage of such wafer was measured by a shadow moire-type warpage measurement device (by Akrometrix).

Surface Roughness after Grinding

A compression molding device (by APIC YAMADA CORPORATION) was used to mold the above resin composition on a 12-inch silicon wafer having a thickness of 775 μm so that a resin thickness after molding would be 400 μm. Molding temperatures and molding times are shown in Table 1. After performing post curing at 180° C. for two hours, a grinding device (by DISCO Corporation) was used to grind the encapsulated resin surface of this wafer by 20 μm under the following conditions.

Wheel: #1500 resin bond wheel

Spindle rotation number: 1,300 rpm

Chuck table rotation number: 300 rpm

Feed rate: 0.3 μm/s

An arithmetic average roughness Ra of the ground encapsulated resin surface was measured by a laser microscope (by KEYENCE CORPORATION) under the following conditions, and there was obtained an average value.

Measurement location: two locations that are 75 cm away from the center of the ground 12-inch wafer Magnification: 20 folds Length: 500 μm Crack Resistance A flip chip bonder (by Panasonic Industry Co., Ltd.) was used to mount a silicon chip(s) (2 cm×2 cm×thickness 150 μm) having a die attach film (thickness 50 μm) on a 12-inch silicon wafer having a thickness of 775 μm. A compression molding device (by APIC YAMADA CORPORATION) was then used to mold the above resin composition on such wafer so that a resin thickness after molding would be 400 μm. Molding temperatures and molding times are shown in Table 1. After performing post curing at 180° C. for two hours, a grinding device (by DISCO Corporation) was used to grind the encapsulated resin surface of this wafer to the extent that the surface of the silicon chip would be exposed. Next, the wafer was diced into test pieces each having a size of 2.2 cm×2.2 cm via a dicing device (by DISCO Corporation). These test pieces were then subjected to a temperature cycle test (−65° C. to 150° C., 1,000 cycles), where x was given to examples exhibiting cracks in the resin part after the temperature cycle test, and ○ was given to examples exhibiting no cracks in the resin part after the test.

Moisture Resistance

Using a vacuum press machine (by Nikko-Materials Co., Ltd.), the above resin composition was thermally cured under the molding temperature and molding time shown in Table 1, thereby obtaining a cured product of 50 mmΦ×3 mint. After post-curing this cured product at 180° C. for two hours, the post-cured product was then stored in a thermo-hygrostat of 85° C., 85% RH for 168 hours, after which the mass of this product was measured. Moisture resistance was evaluated in terms of a moisture absorptivity which is expressed by [(mass of cured product after storage−mass of cured product before storage)/mass of cured product before storage]×100(%).

Dielectric Properties

Using a vacuum press machine (by Nikko-Materials Co., Ltd.), the above resin composition was thermally cured under the molding temperature and molding time shown in Table 1, thereby obtaining a cured resin film of 5 cm×5 cm×200 μmt. After post-curing this cured resin film at 180° C. for two hours, a network analyzer (by Keysight Technologies) and a stripline (by KEYCOM Corporation) were connected to measure a relative permittivity and dielectric tangent at a frequency of 10 GHz.

TABLE 1

| | | | Working example | | | | | | |
|---|---|---|---|---|---|---|---|---|---|
| Composition table (part by mass) | | | 1 | 2 | 3 | 4 | 5 | 6 | 7 |
| (A) | A-1 | SLK-3000 | 100 | 100 | 100 | 100 | 100 | | |
| | A-2 | SLK-2600 | | | | | | 100 | 100 |
| | A'-3 | BMI-2300 | | | | | | | |
| (B) | B-1 | PERCUMYL D | 2 | | 2 | 2 | 2 | 2 | |
| | B-2 | 2E4MZ | | 2.1 | | | | | 2.1 |
| (C) | C-1 | MUF-4 (treated with KBM-573) | 238 | 251 | 408 | | | 238 | 251 |
| | C-2 | MUF-4 (treated with KBM-903) | | | | 238 | | | |
| | C-3 | SO-25H (treated with KBM-573) | | | | | 238 | | |
| | C'-4 | MUF-4 | | | | | | | |
| | C'-5 | RS-8225H/53C | | | | | | | |
| | C'-6 | FB-5604FC (treated with KBM-573) | | | | | | | |
| (D) | D-1 | HP-7200 | | 5.3 | | | | | 5.3 |
| (E) | E-1 | KBM-573 | | | | | | | |
| Property evaluation | | Molding temperature(° C.) | 150 | 160 | 150 | 150 | 150 | 150 | 160 |
| | | Molding time (sec.) | 600 | 600 | 600 | 600 | 600 | 600 | 600 |
| | | Warpage (mm) | 0.3 | 0.5 | 0.7 | 0.4 | 0.5 | 0.7 | 0.8 |
| | | Surface roughness after grinding Ra (um) | 0.13 | 0.14 | 0.15 | 0.12 | 0.10 | 0.13 | 0.14 |
| | | Crack resistance | ○ | ○ | ○ | ○ | ○ | ○ | ○ |
| | | Moisture absorptivity (%) | 0.14 | 0.16 | 0.10 | 0.15 | 0.15 | 0.12 | 0.15 |
| | Dielectric property (10 GHz) | Relative permittivity | 2.9 | 2.9 | 3.1 | 3.0 | 3.0 | 2.9 | 3.0 |
| | | Dielectric tangent | 0.0011 | 0.0015 | 0.0009 | 0.0012 | 0.0018 | 0.0021 | 0.0025 |

| | | | Working example | | Comparative example | | | | |
|---|---|---|---|---|---|---|---|---|---|
| Composition table (part by mass) | | | 8 | 9 | 1 | 2 | 3 | 4 | 5 |
| (A) | A-1 | SLK-3000 | 70 | 50 | | 100 | 100 | 100 | 100 |
| | A-2 | SLK-2600 | 30 | 50 | | | | | |
| | A'-3 | BMI-2300 | | | 100 | | | | |
| (B) | B-1 | PERCUMYL D | 2 | 2 | 2 | 2 | 2 | 2 | 2 |
| | B-2 | 2E4MZ | | | | | | | |
| (C) | C-1 | MUF-4 (treated with KBM-573) | 238 | 238 | 238 | | | | |
| | C-2 | MUF-4 (treated with KBM-903) | | | | | | | |

TABLE 1-continued

| | | | | | | | | | |
|---|---|---|---|---|---|---|---|---|---|
| | C-3 | SO-25H (treated with KBM-573) | | | | | | | |
| | C'-4 | MUF-4 | | | | 238 | | | 237 |
| | C'-5 | RS-8225H/53C | | | | | 238 | | |
| | C'-6 | FB-5604FC (treated with KBM-573) | | | | | | 238 | |
| (D) | D-1 | HP-7200 | | | | | | | |
| (E) | E-1 | KBM-573 | | | | | | | 0.7 |
| Property evaluation | | Molding temperature(° C.) | 150 | 150 | 170 | 150 | 150 | 150 | 150 |
| | | Molding time (sec.) | 600 | 600 | 600 | 600 | 600 | 600 | 600 |
| | | Warpage (mm) | 0.5 | 0.6 | 3.2 | 0.9 | 0.3 | 0.3 | 0.8 |
| | | Surface roughness after grinding Ra (um) | 0.13 | 0.12 | 0.16 | 0.16 | 0.32 | 0.35 | 0.15 |
| | | Crack resistance | ○ | ○ | x | ○ | ○ | ○ | ○ |
| | | Moisture absorptivity (%) | 0.14 | 0.13 | 0.22 | 0.17 | 0.14 | 0.14 | 0.16 |
| | Dielectric | Relative permittivity | 2.9 | 2.9 | 3.3 | 3.0 | 2.9 | 2.9 | 2.9 |
| | property (10 GHz) | Dielectric tangent | 0.0014 | 0.0015 | 0.0096 | 0.0021 | 0.0011 | 0.0019 | 0.0018 |

As shown in Table 1, the resin composition of the present invention exhibited a reduced and restricted warpage after molding, a small surface roughness after grinding, an excellent crack resistance, an excellent moisture resistance, and excellent dielectric properties. Thus, the encapsulation resin composition of the present invention is suitable for encapsulating a semiconductor element-mounted surface of a substrate with a semiconductor element(s) mounted thereon or a semiconductor element-forming surface of a wafer with a semiconductor element(s) formed thereon.

What is claimed is:

1. A package comprising a cured product of an encapsulation resin composition for encapsulating a semiconductor element-mounted surface of a substrate with one or more semiconductor elements mounted thereon or a semiconductor element-forming surface of a wafer with one or more semiconductor elements formed thereon, comprising:

(A) a maleimide compound having at least one dimer acid frame-derived hydrocarbon group per molecule;

(B) a reaction initiator; and (C) an inorganic filler surface-treated with a silane coupling agent, wherein the component (C) has a maximum particle size of not larger than 40 μm, wherein the silane coupling agent used to surface-treat the inorganic filler as the component (C) is at least one aminosilane selected from N-2-(aminoethyl)-3-aminopropyltrimethoxysilane, N-2-(aminoethyl)-8-aminooctyltrimethoxysilane, 3-aminopropyltrimethoxysilane, N-phenyl-3-aminopropyltrimethoxysilane, and 2,2-dimethoxy-1-phenyl-1-aza-2-silacyclopentane, wherein the component (C) is contained in an amount of 30 to 95% by mass in the whole composition, and wherein the cured product of the encapsulation resin composition is part of a wafer level package, a panel level package, a fan-out wafer level package or an antenna-in-package.

2. The package comprising a cured product of the encapsulation resin composition according to claim 1, wherein the component (A) is at least a maleimide compound represented by the following formula (1) and/or a maleimide compound represented by the following formula (2)

(1)

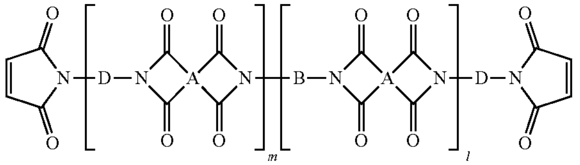

wherein A independently represents a tetravalent organic group having a cyclic structure; B independently represents a divalent alicyclic hydrocarbon group having 6 to 60 carbon atoms; D independently represents a divalent hydrocarbon group having 6 to 200 carbon atoms, where at least one D represents a dimer acid frame-derived hydrocarbon group; m is 1 to 100, and 1 is 1 to 200; no restrictions are imposed on an order of each repeating unit identified by m and 1, and a bonding pattern may be alternate, block or random, (2)

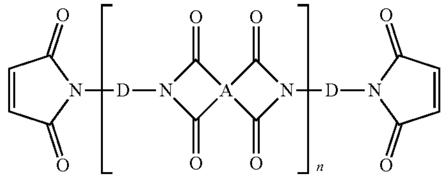

wherein A independently represents a tetravalent organic group having a cyclic structure; D independently represents a divalent hydrocarbon group having 6 to 60 carbon atoms, where at least one D represents a dimer acid frame-derived hydrocarbon group; n is 0 to 100.

3. The package comprising a cured product of the encapsulation resin composition according to claim 2, wherein A in the formulae (1) and (2) is any one of the tetravalent organic groups represented by the following structural formulae

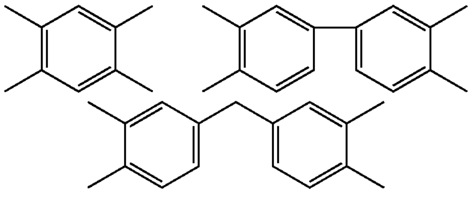

-continued

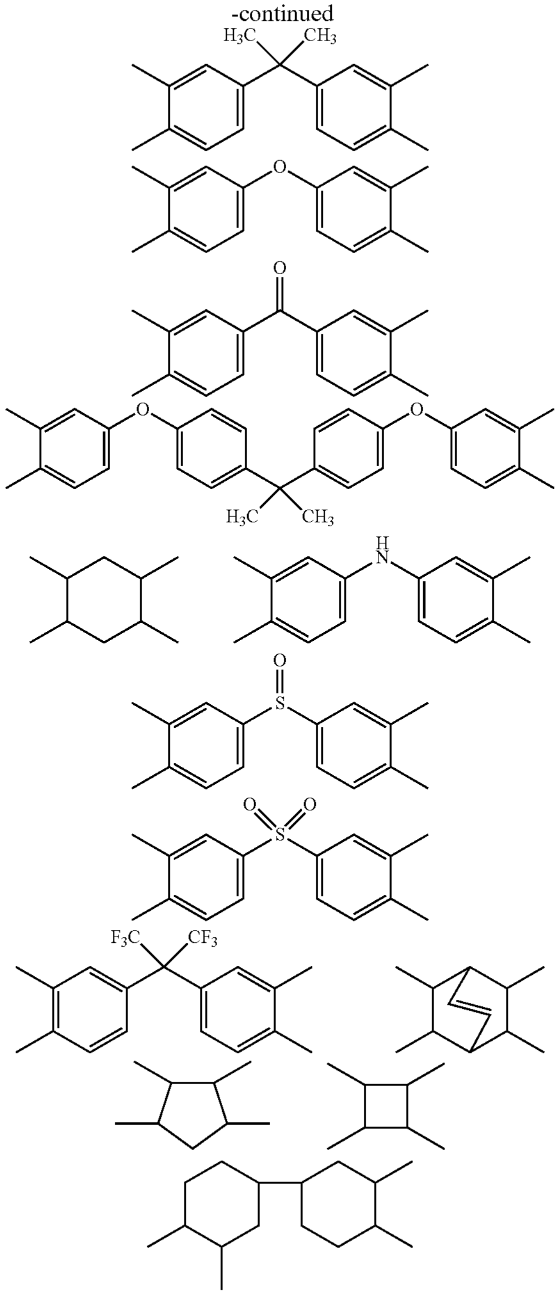

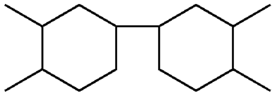

and

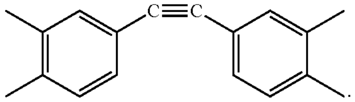

4. The package comprising a cured product of the encapsulation resin composition according to claim 1, wherein the component (B) is a thermal radical polymerization initiator and/or an anionic polymerization initiator.

5. A semiconductor device having a cured product of an encapsulation resin composition for encapsulating a semiconductor element-mounted surface of a substrate with one or more semiconductor elements mounted thereon or a semiconductor element-forming surface of a wafer with one or more semiconductor elements formed thereon, comprising:

(A) a maleimide compound having at least one dimer acid frame-derived hydrocarbon group per molecule;

(B) a reaction initiator; and (C) an inorganic filler surface-treated with a silane coupling agent, wherein the component (C) has a maximum particle size of not larger than 40 μm, wherein the silane coupling agent used to surface-treat the inorganic filler as the component (C) is at least one aminosilane selected from N-2-(aminoethyl)-3-aminopropyltrimethoxysilane, N-2-(aminoethyl)-8-aminooctyltrimethoxysilane, 3-aminopropyltrimethoxysilane, N-phenyl-3-aminopropyltrimethoxysilane, and 2,2-dimethoxy-1-phenyl-1-aza-2-silacyclopentane, wherein the component (C) is contained in an amount of 30 to 95% by mass in the whole composition, and wherein the cured product of the encapsulation resin composition encapsulates a semiconductor element-mounted surface of a substrate with one or more semiconductor elements mounted thereon.

6. The semiconductor device having a cured product of the encapsulation resin composition according to claim 5, wherein the component (A) is at least a maleimide compound represented by the following formula (1) and/or a maleimide compound represented by the following formula (2)

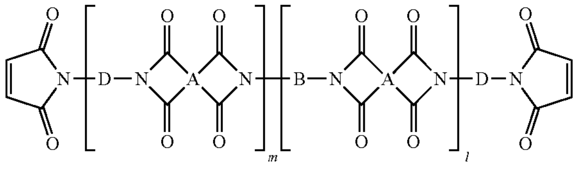

wherein A independently represents a tetravalent organic group having a cyclic structure; B independently represents a divalent alicyclic hydrocarbon group having 6 to 60 carbon atoms; D independently represents a divalent hydrocarbon group having 6 to 200 carbon atoms, where at least one D represents a dimer acid frame-derived hydrocarbon group; m is 1 to 100, and 1 is 1 to 200; no restrictions are imposed on an order of each repeating unit identified by m and 1, and a bonding pattern may be alternate, block or random,

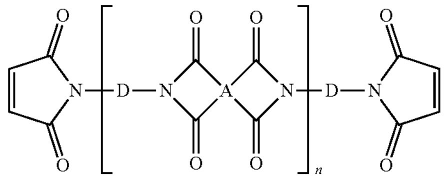

wherein A independently represents a tetravalent organic group having a cyclic structure; D independently represents a divalent hydrocarbon group having 6 to 60 carbon atoms, where at least one D represents a dimer acid frame-derived hydrocarbon group; n is 0 to 100.

7. The semiconductor device having a cured product of the encapsulation resin composition according to claim 6, wherein A in the formulae (1) and (2) is any one of the tetravalent organic groups represented by the following structural formulae

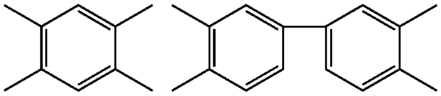
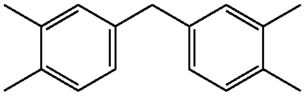
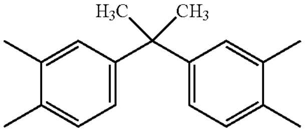
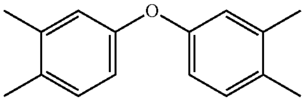
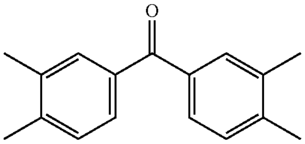
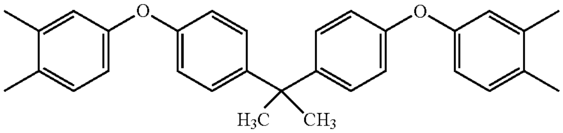
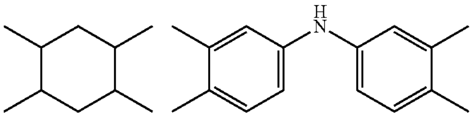
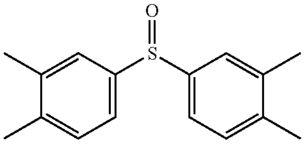
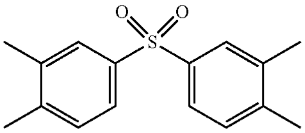
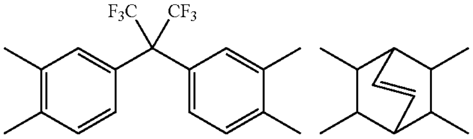
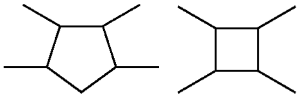
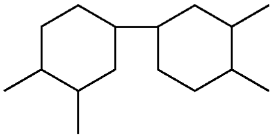
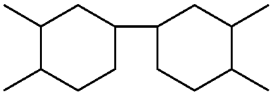

and

-continued

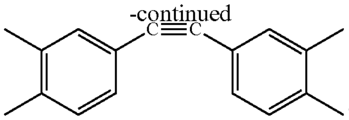

.

8. The semiconductor device having a cured product of the encapsulation resin composition according to claim 5, wherein the component (B) is a thermal radical polymerization initiator and/or an anionic polymerization initiator.

9. A semiconductor device having a cured product of an encapsulation resin composition for encapsulating a semiconductor element-mounted surface of a substrate with one or more semiconductor elements mounted thereon or a semiconductor element-forming surface of a wafer with one or more semiconductor elements formed thereon, comprising:

(A) a maleimide compound having at least one dimer acid frame-derived hydrocarbon group per molecule;

(B) a reaction initiator; and (C) an inorganic filler surface-treated with a silane coupling agent, wherein the component (C) has a maximum particle size of not larger than 40 μm, wherein the silane coupling agent used to surface-treat the inorganic filler as the component (C) is at least one aminosilane selected from N-2-(aminoethyl)-3-aminopropyltrimethoxysilane, N-2-(aminoethyl)-8-aminooctyltrimethoxysilane, 3-aminopropyltrimethoxysilane, N-phenyl-3-aminopropyltrimethoxysilane, and 2,2-dimethoxy-1-phenyl-1-aza-2-silacyclopentane, wherein the component (C) is contained in an amount of 30 to 95% by mass in the whole composition, and wherein the cured product of the encapsulation resin composition encapsulates a semiconductor element-forming surface of a wafer with one or more semiconductor elements formed thereon.

10. The semiconductor device having a cured product of the encapsulation resin composition of claim 9, wherein said wafer is a silicon wafer.

11. The semiconductor device having a cured product of the encapsulation resin composition of claim 10, wherein said wafer is a 12-inch silicon wafer.

12. The semiconductor device having a cured product of the encapsulation resin composition according to claim 9, wherein the component (A) is at least a maleimide compound represented by the following formula (1) and/or a maleimide compound represented by the following formula (2)

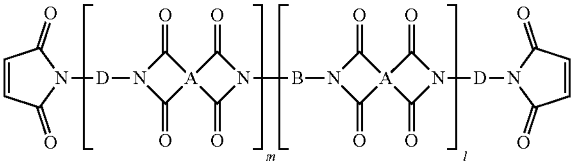

wherein A independently represents a tetravalent organic group having a cyclic structure; B independently represents a divalent alicyclic hydrocarbon group having 6 to 60 carbon atoms; D independently represents a divalent hydrocarbon group having 6 to 200 carbon atoms, where at least one D represents a dimer acid frame-derived hydrocarbon group; m is 1 to 100, and 1 is 1 to 200; no restrictions are imposed on an order of each repeating unit identified by m and 1, and a bonding pattern may be alternate, block or random,

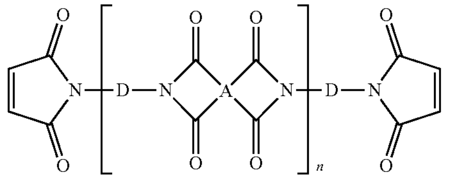

wherein A independently represents a tetravalent organic group having a cyclic structure; D independently represents a divalent hydrocarbon group having 6 to 60 carbon atoms, where at least one D represents a dimer acid frame-derived hydrocarbon group; n is 0 to 100.

13. The semiconductor device having a cured product of the encapsulation resin composition according to claim 12, wherein A in the formulae (1) and (2) is any one of the tetravalent organic groups represented by the following structural formulae

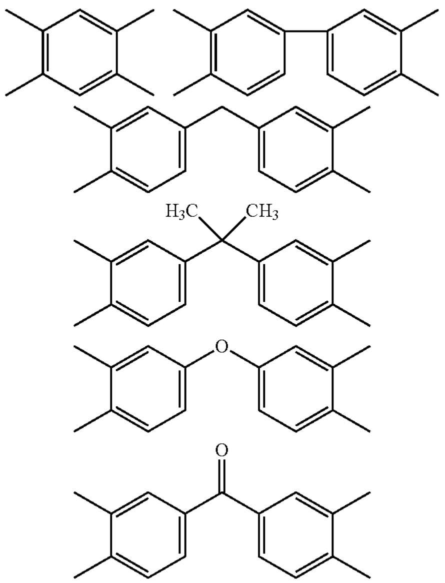

-continued

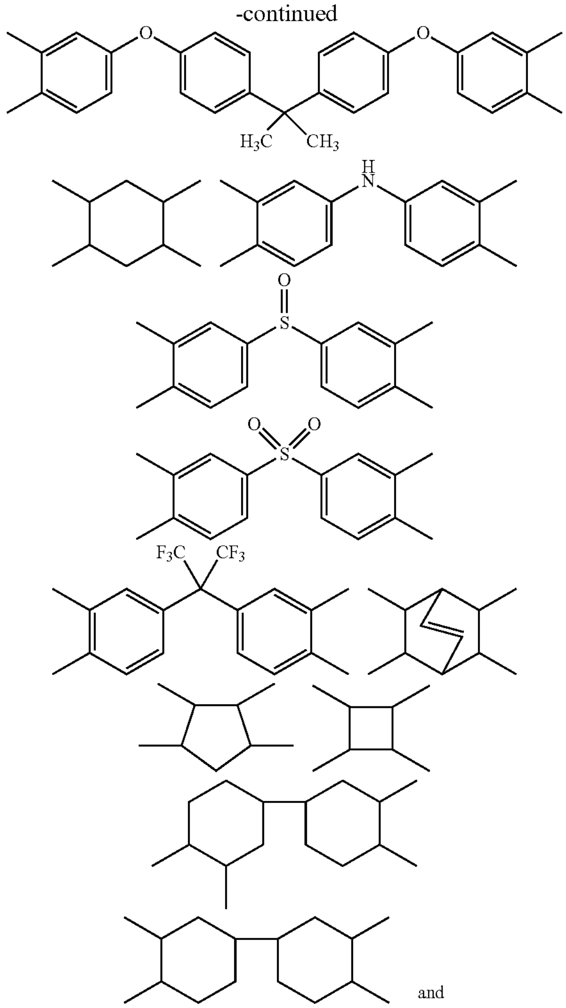

and

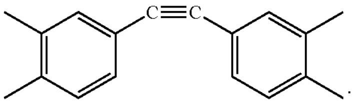

.

14. The semiconductor device having a cured product of the encapsulation resin composition according to claim 9, wherein the component (B) is a thermal radical polymerization initiator and/or an anionic polymerization initiator.

* * * * *